UNITED STATES PATENT OFFICE.

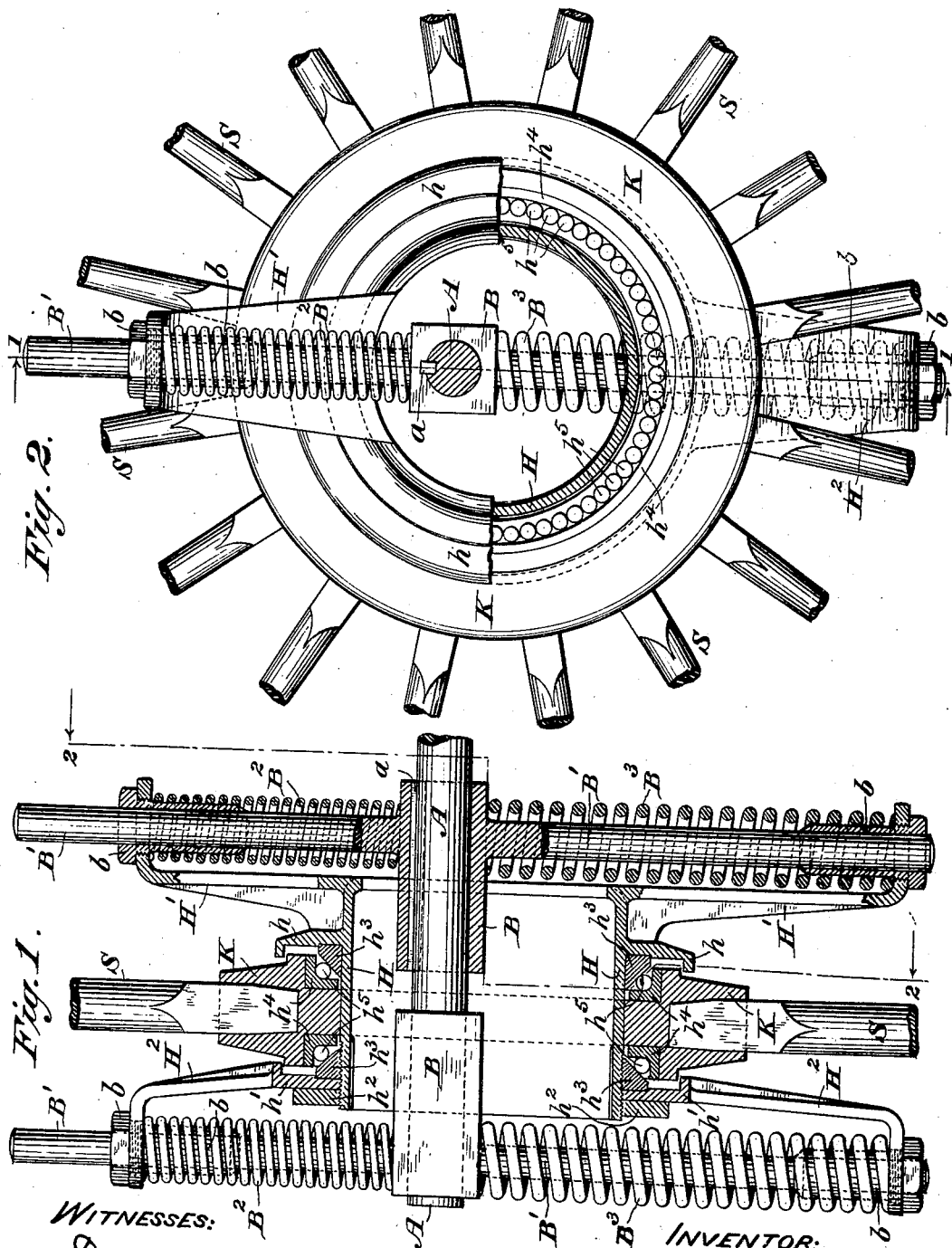

CHRISTIAN A. RITTMAN, OF SANDUSKY, OHIO, ASSIGNOR OF ONE-FOURTH TO LEVERETT L. CURTIS AND ONE-FOURTH TO JOHN WHITWORTH, OF SANDUSKY, OHIO.

VEHICLE-WHEEL.

No. 856,367.     Specification of Letters Patent.     Patented June 11, 1907.

Application filed September 1, 1905. Serial No. 276,696.

*To all whom it may concern:*

Be it known that I, CHRISTIAN A. RITTMAN, a citizen of the United States, and a resident of Sandusky, county of Erie, and State of Ohio, have invented a new and useful Improvement in Vehicle-Wheels, of which the following is a specification, the principle of the invention being herein explained and the best mode in which I have contemplated applying that principle so as to distinguish it from other inventions.

My invention relates to wheels for vehicles and particularly to wheels for vehicles such as automobiles and the like where it is desirable to obviate as nearly as possible all shocks and jars due to obstructions in the path of the wheel. To this end it has been found necessary in addition to the springs on which the vehicle-body may be mounted to make the wheel structure itself resilient. Such resiliency in the wheel, as is well known, has been heretofore successfully obtained only by the use of pneumatic tires, which are both cumbersome and expensive. My improved wheel then is designed to secure equal resiliency by other and superior means hereinafter fully described and specifically set forth in the claims.

The annexed drawing and the following description set forth in detail certain mechanism embodying the invention, such disclosed means constituting but one of various mechanical forms in which the principle of the invention may be used.

In said annexed drawing: Figure 1 represents a vertical transverse cross-section of that portion of a wheel involving my improved construction, a portion of such construction appearing in elevation; Fig. 2 represents a side elevation of the same, a portion being cut away on the line 2—2 in Fig. 1 to better show the arrangement of certain internal parts.

As clearly shown in Fig. 1 of said drawing my improved wheel structure comprises as principal elements an inner hollow hub, H, to which the vehicle spindle A is attached in a manner presently to be set forth, and an outer hub-member K revolubly mounted on such inner hub. The spokes S of the wheel are mounted on this outer hub. To retain this outer hub K upon inner hub H the latter is provided with two peripheral flanges $h$, $h'$. Of these, flange $h$ is formed integral with hub H, while flange member $h'$ is screw-threaded on such hub as indicated in Fig. 1. A lock nut $h^2$ serves to secure the flange $h'$ when it is properly positioned on the hub. The bearing between the two hub members is preferably a ball bearing and to this end a ball-race is formed by the introduction between hub-member K and flanges $h$ and $h'$, respectively, of a ring $h^3$ forming a cone bearing surface and oppositely disposed thereto a ring $h^4$ with a concave bearing surface. Between these two surfaces run the balls $h^5$.

The vehicle spindle A extends into the central opening in inner hub H, being supported therein in two axle-boxes B, B. Formed integral with each such axle-box are two oppositely extending rods B' B' slidably mounted in brackets H' H' and H² H² which project outwardly from hub H and the flange-member $h'$, respectively, each pair of brackets being likewise oppositely disposed. Flange-member $h'$ is positioned on hub H so that the two pair of brackets, one on each side of the hub, are parallel. A key $a$ on axle A is adapted to retain the axle-boxes B in such position that the rods B' thereon, together with the brackets through which such rods slide, are maintained in a vertical position. Obviously the same result might be accomplished in a variety of ways, as by having the end of the vehicle spindle and the corresponding opening in the axle-box square or triangular, the object being simply to prevent the rotation of the inner hub-member H about the vehicle spindle and to maintain the rods B' in a vertical position.

It is thus evident that the axle-boxes B and vehicle axle A are free to vibrate vertically within the limits of the central opening in inner hub H. Sleeves $b$ secured in the ends of brackets H' and H² provide bearings for the rods B' as they thus vibrate, and also prevent their being disengaged from the brackets H', H². Interposed between the axle-boxes B and brackets H' and H² and inclosing rods B' are helical springs B² B² and B³ B³. The upper springs B² are suspension springs and are suitably secured at their ends to the bracket and axle-box, respectively; while the lower springs B³ are compression springs.

By virtue of the construction just described it will at once appear that all jars and shocks to which the wheel is subjected in passing over rough and uneven roads will be taken up by the springs $B^2$, $B^3$ as the vehicle spindle vibrates within hub H. The springs $B^2$ $B^3$ are so proportioned that the vehicle spindle normally lies above the center of the opening in the inner hub, since the effect of passing over an obstruction will be to raise the wheel with reference to the spindle. By extending the brackets $H'$ $H^2$, and by varying the strength of springs $B^2$ $B^3$, practically any degree of resiliency can be imparted to the wheel. My improved wheel structure, therefore, provides in effect not a resilient wheel but a resilient axle, since it is the non-rotating hub-member H that is provided with springs. The advantage of this arrangement is that the sliding rods $B'$ need not be pivoted at their points of attachment to the wheel structure, since they are maintained constantly in a vertical position, and hence the rigidity which is essential to a practical wheel is not sacrificed, while any degree of resiliency is at the same time obtainable.

Having thus described my invention in detail, that which I particularly point out and distinctly claim, is:

1. In a vehicle wheel, the combination of a vehicle spindle provided with two guide-members, an inner hub located between said guide-members, means exterior to said hub resiliently connecting the same with said spindle, and an outer hub revolubly mounted upon said inner hub.

2. In a vehicle wheel, the combination of a vehicle spindle provided with two spaced vertically disposed guide-members, an inner hub located between said guide-members and slidably mounted thereon, resilient means interposed between said spindle and the portions of said inner hub mounted on said guide-members, and an outer hub revolubly mounted upon said inner hub.

3. In a vehicle wheel, the combination of a vehicle spindle provided with vertically disposed guide-members, an inner hub surrounding said spindle and provided with radially extending arms bearing lateral projections at their ends, respectively, such projections being slidably mounted upon said guide-members, resilient means interposed between said spindle and said inner hub, and an outer hub revolubly mounted upon said inner hub.

4. In a vehicle wheel, the combination of a vehicle spindle, an inner hub surrounding the same and provided with projecting brackets, resilient means interposed between said spindle and said brackets and an outer hub revolubly mounted upon said inner hub.

5. In a vehicle wheel, the combination of a vehicle spindle, an inner hub surrounding said spindle and vertically movable with reference thereto, said inner hub being provided with projecting brackets, resilient means interposed between said spindle and said brackets and an outer hub revolubly mounted upon said inner hub.

6. In a vehicle wheel, the combination of a vehicle spindle provided with two spaced vertically disposed guide-members, an inner hub surrounding said spindle between said guide-members and provided with brackets slidably mounted thereon, resilient means interposed between said spindle and said brackets, and an outer hub revolubly mounted upon said inner hub.

7. In a vehicle wheel, the combination of a member provided with guides and adapted to receive a vehicle spindle, an inner hub slidably mounted on said guides, resilient means interposed between said member and said inner hub and an outer hub revolubly mounted upon said inner hub.

8. In a vehicle wheel, the combination of an axle-box provided with guide-members and adapted to be secured on a vehicle spindle, an inner hub slidably mounted on said guide members, resilient means interposed between said axle-box and said inner hub, and an outer hub revolubly mounted upon said inner hub.

9. In a vehicle wheel, the combination of an axle-box provided with oppositely disposed guide-members and adapted to be secured on a vehicle spindle so as to maintain said guide-members vertical, an inner hub slidably mounted on said guide members, resilient means interposed between said axle-box and said inner hub, and an outer hub revolubly mounted upon said inner hub.

10. In a vehicle wheel, the combination of an axle-box comprising two parts each provided with oppositely disposed guide-members and adapted to be secured on a vehicle spindle so as to maintain said guide-members vertical, an inner hub slidably mounted on said guide members, resilient means interposed between said axle-box and said inner hub, and an outer hub revolubly mounted upon said inner hub.

11. In a vehicle wheel, the combination with a vehicle spindle, of an inner hub having projecting brackets, an axle-box adapted to receive and be keyed to said vehicle spindle and provided with oppositely disposed rods slidably mounted in said brackets, resilient members interposed between said axle-box and said brackets, and an outer hub revolubly mounted on said inner hub.

12. In a vehicle wheel, the combination with a vehicle spindle, of an inner hub having projecting brackets, an axle-box adapted to receive and be keyed to said vehicle spindle and provided with oppositely disposed rods slidably mounted in said brackets, springs interposed between said axle-box and said brackets, and an outer hub revolubly mounted on said inner hub.

13. In a vehicle wheel, the combination with a vehicle spindle, of an inner hub having a pair of oppositely disposed brackets on each side, two separate axle-boxes keyed to said vehicle spindle and respectively provided with vertically disposed rods slidably mounted in said brackets, resilient members interposed between said axle-boxes and said brackets, and an outer hub revolubly mounted on said inner hub.

14. In a vehicle wheel, the combination with a vehicle spindle, of an inner hub composed of two separable members each provided with a pair of oppositely disposed brackets, two axle-boxes keyed to said vehicle spindle and respectively provided with a pair of vertically disposed rods adapted to be slidably mounted in the corresponding pair of brackets, helical springs mounted on said rods between said axle-boxes and said brackets, and an outer hub revolubly mounted upon said inner hub.

Signed by me this 28th day of August, 1905.

CHRISTIAN A. RITTMAN.

Attested by:
  MARY E. CLOSE,
  A. C. CLOSE.